Oct. 13, 1953  J. WILSON  2,654,944
METHOD OF MAKING GEARS
Filed April 10, 1950
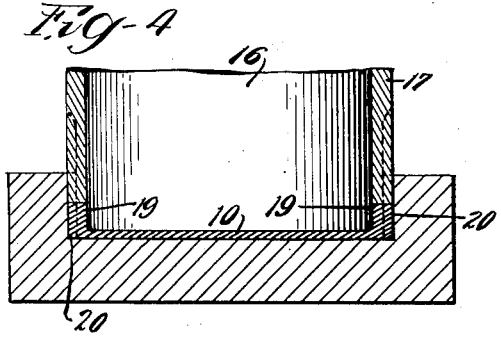
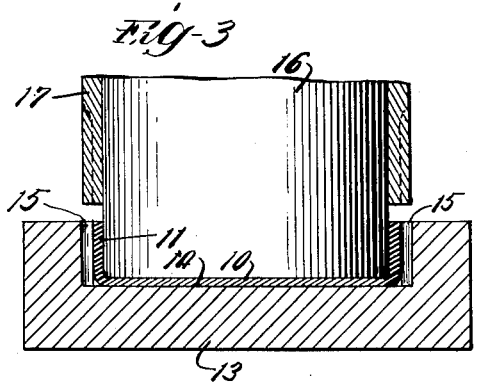
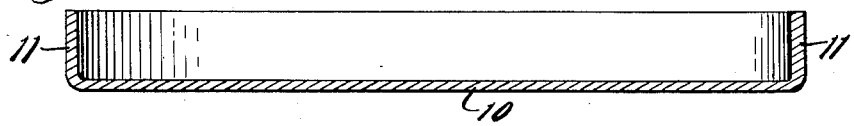
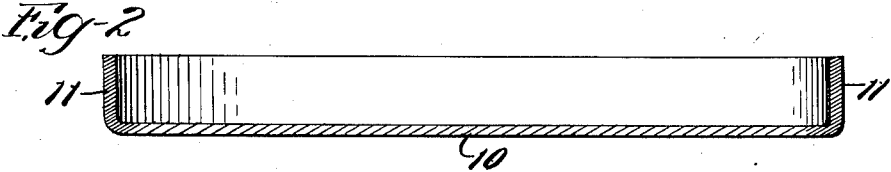
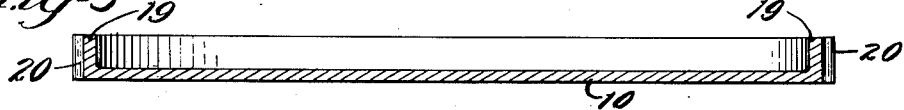
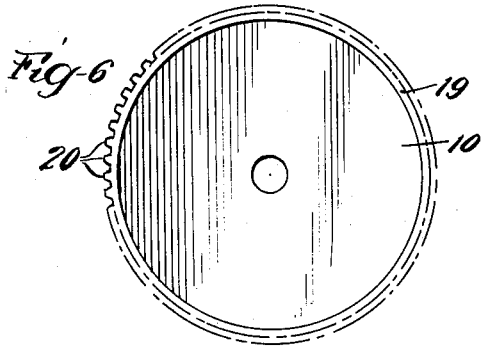
INVENTOR.
Jack Wilson
BY
Mann and Brown
Attys.

Patented Oct. 13, 1953

2,654,944

UNITED STATES PATENT OFFICE 2,654,944

METHOD OF MAKING GEARS

Jack Wilson, Chicago, Ill., assignor to Universal Railway Devices Co., a corporation of Delaware Application April 10, 1950, Serial No. 154,949

2 Claims. (Cl. 29—159.2)

The principal object of this invention is to produce gears by forging teeth thereon instead of machining them.

Generally speaking, this is accomplished by forming a disk of wrought metal with a peripheral enlargement, heating said enlargement by electrical induction, and pressing the metal of the enlargement axially and radially into a toothed die.

In the diagrammatic drawings:

Fig. 1 is a diametrical section through a disk provided with a peripheral enlargement;

Fig. 2 is a similar view with the enlargement heated to forging temperature by electrical induction;

Fig. 3 is an assembly view of the disk shown in Fig. 2 with the dies preparatory to the pressing or forging operation;

Fig. 4 is a view similar to Fig. 3 with the dies at the end of the forming stroke; and Figs. 5 and 6 are a diametric section and side elevation of a spur gear formed by the operations illustrated in the other figures.

The disk 10 shown in Fig. 1 is provided with a peripheral enlargement 11, and may be formed by drawing a circular disk of sheet metal or by drop forging, or otherwise.

The enlargement 11 should have sufficient metal in it to form the rim portion of the gear and the teeth. Preparatory to forging, the enlargement is subjected to heating by electrical induction, which quickly brings that portion of the metal to forging temperature while the main body of the disk remains comparatively cold. The blank is then transferred to a fixed die 13 having a socket 14 provided on its periphery with teeth 15 complemental to the teeth to be formed on the gear. The blank is held in position by a plug 16 fitting within the enlargement 11 and holding the web portion of the blank against the bottom of the socket 14 of the die 13. While held in this position, the forming die 17 is brought down from the position shown in Fig. 3 to that shown in Fig. 4, forcing the heated metal in the enlargement axially and radially to form the rim portion 19 of the gear with the teeth 20 thereon.

Heating by electrical induction is well known, and will require no particular description; but, by way of example, reference is made to "Electrical Production," February 1946, an article by A. L. Furman.

The operation is very simple and economical, and produces excellent gears at low cost.

I claim:

1. The process of making a toothed gear which includes forming a hollow cup-shaped metal blank in the form of a circular disk with a relatively high and thin circular flange upstanding from its periphery, positioning the blank in a die cavity having on its inner periphery teeth complemental to the teeth to be formed on said gear, inserting into the hollow of the blank a plug having a side wall snugly fitting the flange and having a flat bottom surface engaging the disk and pressing it against the bottom of the die cavity, and then pressing down onto the upper edge of the flange a forming die which is sleeved around the plug for movement axially thereon and has its outer periphery formed with teeth fitting the teeth of the die cavity, thereby lowering and thickening the flange by forcing the metal thereof axially and radially into the teeth of the die cavity.

2. The process of making a toothed gear which includes forming a hollow cup-shaped metal blank in the form of a circular disk with a relatively high and thin circular flange upstanding from its periphery, quickly heating only said flange by electrical induction while the disk remains relatively cold, positioning the blank in a die cavity having on its inner periphery teeth complemental to the teeth to be formed on said gear, inserting into the hollow of the blank a plug having a side wall snugly fitting the flange and having a flat bottom surface engaging the disk and pressing it against the bottom of the die cavity, and then pressing down onto the upper edge of the flange a forming die which is sleeved around the plug for movement axially thereon and has its outer periphery formed with teeth fitting the teeth of the die cavity, thereby lowering and thickening the flange by forcing the metal thereof axially and radially into the teeth of the die cavity.

JACK WILSON.

References Cited in the file of this patent

UNITED STATES PATENTS

| Number | Name | Date |
|---|---|---|
| 387,470 | Weeden | Aug. 7, 1888 |
| 472,664 | Bliss | Apr. 12, 1892 |
| 637,655 | Parish | Nov. 21, 1899 |
| 1,338,462 | Rydbeck | Apr. 27, 1920 |
| 1,354,779 | Rydbeck | Oct. 5, 1920 |
| 1,454,508 | Eckert | May 8, 1923 |
| 1,511,199 | Champion et al. | Oct. 7, 1924 |
| 1,668,442 | Wineman | May 1, 1928 |
| 1,689,218 | Whitney | Oct. 30, 1928 |
| 1,729,300 | Terbush | Sept. 24, 1929 |
| 1,812,150 | Irelan | June 30, 1931 |
| 2,125,866 | Bell | Aug. 9, 1938 |
| 2,319,546 | Insley et al. | May 18, 1943 |
| 2,385,617 | Eiseman et al. | Sept. 25, 1945 |

FOREIGN PATENTS

| Number | Country | Date |
|---|---|---|
| 27,897 | Great Britain | Nov. 27, 1897 |
| 577,887 | Great Britain | June 4, 1946 |